United States Patent
De Ruijter et al.

(10) Patent No.: US 8,243,359 B2
(45) Date of Patent: Aug. 14, 2012

(54) WINDOW BLIND WITH ILLUMINATED LAMELLAE

(75) Inventors: Hendrikus Albertus Adrianus Maria De Ruijter, Eindhoven (NL); Cornelis Reinder Ronda, Eindhoven (NL); Egbertus Hendrikus Maria Smits, Eindhoven (NL)

(73) Assignee: Philips Koninklijke Philips Electronics N.V., Eindhoven (NL)

( * ) Notice: Subject to any disclaimer, the term of this patent is extended or adjusted under 35 U.S.C. 154(b) by 75 days.

(21) Appl. No.: 12/673,810

(22) PCT Filed: Aug. 18, 2008

(86) PCT No.: PCT/IB2008/053305
§ 371 (c)(1),
(2), (4) Date: Dec. 1, 2010

(87) PCT Pub. No.: WO2009/024918
PCT Pub. Date: Feb. 26, 2009

(65) Prior Publication Data
US 2011/0102879 A1    May 5, 2011

(30) Foreign Application Priority Data
Aug. 21, 2007  (EP) .................................. 07114661

(51) Int. Cl.
*G02B 26/00* (2006.01)

(52) U.S. Cl. ........................................ 359/290; 359/296
(58) Field of Classification Search ................. 250/548; 359/290, 296, 592, 618; 362/459, 485
See application file for complete search history.

(56) References Cited

U.S. PATENT DOCUMENTS

| 6,490,402 | B1 | 12/2002 | Ota |
| 2005/0105303 | A1 | 5/2005 | Emde |
| 2007/0018943 | A1 | 1/2007 | Bayrle et al. |

FOREIGN PATENT DOCUMENTS

| DE | 202004013324 U1 | 11/2004 |
| EP | 1371897 A1 | 12/2003 |
| FR | 2854481 A1 | 11/2004 |
| GB | 2431513 A | 4/2007 |
| JP | 2006184561 | 7/2006 |
| WO | 2006123283 A2 | 11/2006 |

*Primary Examiner* — Ricky Mack
*Assistant Examiner* — Mahidere Sahle (57) ABSTRACT

The invention relates to a window blind (10) with at least one lamella (25) and at least one lighting element (20), wherein the lamella (25) comprises an illuminating body (30), the lighting element (20) injects an artificial light (21) into the illuminating body (30), the illuminating body (30) comprises a light guiding material, configured to transport the artificial light (21), the illuminating body (30) comprises a light extraction means (40), configured to receive and to deflect the artificial light (21) out of the illuminating body (30). The invention discloses, that the light extraction means (40) is embedded within the illuminating body (30), and the light extraction means (40) is controllable, in order to vary the degree of deflection of the artificial light (21).

13 Claims, 5 Drawing Sheets

WINDOW BLIND WITH ILLUMINATED LAMELLAE

FIELD OF THE INVENTION

This invention relates to a window blind with at least one lamella and at least one lighting element, wherein the lamella comprises an illuminating body, the lighting element injects an artificial light into the illuminating body, the illuminating body comprises a light guiding material, configured to transport the artificial light, the illuminating body comprises a light extraction means, configured to receive and to deflect the artificial light out of the illuminating body.

BACKGROUND OF THE INVENTION

In the DE 20 2004 013 324 U1 an illumination device mounted on the lamellae of a window blind is disclosed. Onto each lamella a light guiding material is applied, which possesses a surface formed of micro-prisms. Each lamella possesses an individual lighting element, injecting an artificial light into the illuminating body. This artificial light is received and deflected by a layer of micro-prisms and thereby illuminating the surrounding of the window blind. Unfortunately, the deflection of the artificial light is defined by the fixed structure of the micro-prisms. Furthermore, the area illuminated by the light emitting window blind is defined through the position and the angle of the lamellae.

SUMMARY OF THE INVENTION

Thus, the invention has as its object to eliminate the above mentioned disadvantages. In particular, it is an object of the invention to provide an efficient and cheap window blind, which is able to illuminate a dedicated area.

This object is achieved by a window blind as taught by claim 1 of the present invention. Advantageous embodiments of the window blind are defined in the subclaims.

The invention discloses, that the light extraction means is embedded within the illuminating body, and the light extraction means is controllable, in order to vary the degree of deflection of the artificial light.

In the disclosed window blind the light extraction means controls the amount and direction of the artificial light, being deflected out of the illuminating body. This artificial light is injected into the illuminating body by the lighting element. After being guided by the illuminating body, the artificial light strikes the light extraction means and may be deflected to leave the illuminating body through an illuminating surface. Due to the light extraction means it is possible to control the amount and the direction of light leaving the illuminating body. If desired, it is possible to arrange the light extraction means in such a way, that no artificial light is leaving the illuminating body, resulting in the confinement of the artificial light. As the light extraction means is embedded within the illuminating body and controllable, it is possible to change the position of the light extraction means, so that the artificial light is deflected and leaves the illuminating body. Through the possibility of controlling the degree of deflection, the area which is illuminated by the artificial light can be controlled. Therefore, it is possible to illuminate a constant spot in a room—for example a desk—although the angle of the lamellae is changed in the course of a day.

In a first preferred embodiment the light extraction means comprises a plurality of light extraction particles. To achieve a homogeneous flux of artificial light leaving the illuminating body, the light extraction particles may be metallic particles, forming scattering centers and being homogeneously distributed within the illuminating body. This embodiment may be improved in such a way, that the light extraction particles are homogeneously aligned (the transmitting state), if a voltage is applied and wherein the light extraction particles are randomly arranged, if no voltage is applied (the reflective state). Therefore, it is possible to control the fraction of deflected light by the applied voltage. If the window blind respectively the lamella should illuminate a spot within a room a voltage would be applied, resulting in an increased transmission of the artificial light by the device. If on the other hand no illumination would be needed, no voltage would be applied, preventing the transmission of the artificial light.

A further preferred variant of the invention provides for the illuminating body and the light extraction means to form at least one of the following: a suspended particle device, a LC (Liquid Crystal) structure or an electro-chromic device. In suspended particle devices, a thin film laminate of rod-like particles suspended in a fluid is placed between two glass or plastic layers, or attached to one layer. When no voltage is applied, the suspended particles are arranged in random orientations and tend to reflect light, so that the glass panel looks dark or opaque. If voltage is applied, the suspended particles align and let the light pass. In polymer dispersed liquid crystal devices (PDLCs), liquid crystal droplets are arranged in a sheet between two layers of glass. The liquid crystal droplets are randomly oriented but may align according to an electric field. Also electro-chromic devices change their light transmission properties in response to an applied voltage. In electro-chromic windows, the electro-chromic material changes its opacity between a translucent state and a transparent state. Often a pulse of electricity is required for changing its opacity, but once the change has been effectuated, no electricity is needed for maintaining the particular shade which has been reached.

According to a development of the invention, the illuminating body covers one of the surfaces of the lamella. The last named and the illuminating body form a layered structure, in which the illuminating body may cover one or both of the top and bottom surface of the lamella. This embodiment has the advantage, that the illuminating body can be applied on already installed window blinds respectively lamellae. Therefore, already build window blinds may be retrofitted with the illuminating body to achieve an illuminating window blind as disclosed. In a preferred variant of this embodiment, a mirror layer is arranged between the illuminating body and the surface of the lamella. This mirror layer reflects artificial light back into the illuminating body, which is leaving last named through the bottom surface, facing the lamella. Therefore, the overall light output of the illuminating body is increased. If the window blind is used to prevent sunlight from entering a room, the lamella may be made of metal, plastic or wood. All those named materials are intransparent to ambient light. Thus, a combination of the illuminating body and an intransparent lamella results in an overall intransparent window blind. If on the other hand the window blind is not just used for preventing sun from entering the room, it may be preferred that the illuminating body and the lamella are one piece. Therefore, the illuminating body, forming the lamella, may be transparent to artificial and ambient light. Furthermore, the lamella can be used to illuminate a room or the outside surrounding of a window or a building. This would result in a low resolution display function, as a plurality of window blinds, each of those covering a window, would form a display. Such a display could for example be used for branding purposes.

In a preferred embodiment the illuminating body is transparent for an artificial light and also for an ambient light falling onto the window blind. The light extraction means may in this embodiment not only be used to control the deflection of the artificial light, but also the flux of ambient light flowing through the window blind. The light extraction means may be arranged in such a way, that an opaque illumination body occurs. Thus, the window blind may also be used as a flexible wall between rooms or a blocking device for heat entering a room. Furthermore, by changing the angle of the blades, daylight can be integrated in the lighting concept of the window blind. Different quantities of ambient light can be allowed to flow into a room depending on the task, the window blind is used for.

According to a development of the invention, the window blind comprises a computerized control system to control the light extraction means. The computerized control system is a centralized control means, to steer all light extraction means in a lamella or a plurality of the last named. Therefore, the behavior of the window blind can easily be affected by the computerized control element. If for example an area should be illuminated by the illuminating body, all settings can be managed by the computerized control element.

In a decentralized system, each lamella comprises an individual computerized control element to control the light extraction means. In contrast to the above described centralized system, in this embodiment each lamella has its own computerized control element. Therefore, each lamella of a window blind can individually be steered. This is especially advantageous, if the window blind is covering large areas. In this case it is often advantageous, that distinctive parts of the window blind can individually be operated.

In a further preferred variant, the two last described embodiments are combined. In this case the computerized control element of the lamella is connected to and controlled by the computerized control system. This embodiment combines a centralized controlling of the window blind with the decentralized realization of the wanted adjustments. In a preferred variant, the computerized control system or the computerized control element are connected via a LAN (Local Area Network) or WLAN (Wireless Local Area Network) with a computer. The so formed framework of window blind and computer enables the controlling of the setting of the light extraction means by a remote computer. So the changing of the angle, the used illumination or messages formed by the plurality of window blinds can be controlled by a single computer. The window blinds may be equipped with a USB-connection, so that a communication with a computer is possible. Furthermore, a connection of the window blind with the internet as well as an allocation of an individual IP-address to each window blind or even each lamella or lamella groups are possible. Thus, by the so formed window blind system a steering of a plurality of window blinds via the internet by a facility manager is easily possible. The window blind system allows a centralized control of at least the light extraction means of the at least one window blind via network.

The term computerized control element and/or computerized control system in the context of the described invention comprehends all kinds of computer controlled machines like for example laptop, workstation, microcontroller, digital signal processor (DSP) or field programmable gate array (FPGA). Such computerized control elements and/or—systems are able to receive a process and store data, which is measured by all kinds of detector elements. The computerized control system may also be a PDA (Personal Digital Assistant), a handheld device that was original designed as a personal organizer, but nowadays is much more versatile. The use of a PDA as the computerized control system would enable a facility manager to own a mobile system, which allows him to control the window blind. Any changes in the settings of the lamellae could be done via the PDA of the so formed window blind system.

If the disclosed window blind is installed in front of a window, it may not only be used to illuminate the room, but may also be used for advertisement or branding purpose by illuminating the window. Therefore, people walking by the building could see the illuminated windows. If a plurality of windows are illuminated by window blinds and the type of illumination is controlled by a centralized computer as described above, it would be easy to form logos, trademarks or other advertisements by this—low resolution—display. To increase the resolution in another preferred embodiment the illuminating body comprises a plurality of segments, wherein the light extraction means of each segment is independently controllable. Therefore, a higher granularity for a single lamella respectively a single window blind is achieved. Even rangy trademarks can easily be shown on this display like window blind. By connection to a computer respectively a WLAN network, the window blind may be lowered in the evening after the working hours to illuminate the surrounding of a company building to achieve a beautification and to show the trademark of the company. In a preferred variant of this embodiment, the illuminating body or at least one of the segments of the illuminating body comprises a colorant means. This colorant means absorbs and in some cases even reemits the artificial light by a luminescence process, resulting in a change of the wavelength and the color of the artificial light. So multicolor window blinds may easily be formed combined with the ability to control the light flux of the colored artificial light through the light extraction means. In a preferred embodiment the colorant means may comprise an inorganic or organic colorant, preferably at least one of the following colorant: iron oxide, carbon black, nigrosine, phthalocyanine blue, benzidine yellow, quinacridone pink, a Benzoquinone, a quinacridone, a PTCDA (Perylene-3,4,9, 10-tetracarboxylic-dianhydride), a Cyanine, a Triphenylmethane, or a phthalocyanine.

In a preferred embodiment the illuminating body comprises a surface pattern, forming a Fresnel type lens. As each lamella may form a unique Fresnel lens it may transmit a distorted picture for privacy reasons but still allows an illuminating light flux. Furthermore, the flow of daylight may be optimized by using the Fresnel type lens to guide ambient light into a room. Therefore, the window blind can be used as an additional component to illuminate a room. In combination with the light extraction means the window blind with the Fresnel type lens illuminating body combines the ability to focus an ambient light and to control the amount and direction of the flux of the artificial light, leaving the illuminating body.

The invention further discloses that the illuminating body comprises a surface pattern, forming a Fresnel-type lens, wherein the surface pattern comprises a plurality of refractor means. Each refractor means may be arranged in a consecutive manner covering a surface of the illuminating body. By breaking the lens into a set of refractor means a reduced amount of material is needed compared to conventional spherical lenses. As each refractor means itself forms a spherical lens, the combination of all refractor means leads to a large area magnification lens, which possesses a small thickness. As effectively the continuous surface of a standard lens is chopped into a set of surfaces of the same or different curvature, the overall thickness of the lens is decreased, allowing a substantial reduction in thickness of the lamella. These refractor means may have straight or curved profiles with constant or random spacing and may even vary from microns to millimeters in dimension. The arrangement of the refractor means and therefore the configuration of the surface pattern may be circular, linear or have a non uniform pattern. Furthermore, the refractor means may possess a cross-section which is equal to a line-up of small triangles, trapeze or parallelograms. The refractor means may possess a homogeneous design throughout the surface of the illuminating body. In another preferred embodiment the design of the refractor means may change along the main axis of the illuminating body.

Preferably, the lighting element is at least one of the following: a laser, a LED, an OLED, an incandescent lamp or a fluorescent lamp. Depending on the type of usage of the window blind, a single or a plurality of lighting elements may be used. A light emitting diode (LED) is a semiconductor device that emits incoherent narrow spectrum light (typically in the order of 10-20 nm) when electrically biased in the forward direction. The color of the emitted light depends on the composition and the condition of the semiconducting material used. The also applicable organic light emitting diode (OLED) is a special type of a LED, in which the emissive layer comprises a thin film of certain organic components. In general, OLED spectra are not as narrow as those of inorganic LEDs.

In a preferred embodiment the lighting element is embedded in an enclosure element. The enclosure element protects the lighting element from mechanical and environmental impacts and may also contain the computerized control element. Preferably the enclosure element is arranged on one of the side faces of the illuminating body. It may, however, also be located in the housing element of the window blinds. In such a case, optical fibers are being used to guide the light to the illuminating bodies. The optical fibers can be interwoven with the cords of the blinds. These arrangements enable the artificial light to be injected in one of the side faces of the illuminating body, resulting in a homogeneous distribution of the deflected artificial light. If the illuminating body is divided in a plurality of segments, a number of lighting elements may be arranged within the enclosure element. The artificial light emitted by each of the lighting elements may be guided by a light guide, like an optical fiber, to each of the segments. This would enable a separate illumination of each of the segments. Furthermore, each of the lighting elements could emit artificial light with a different wavelength, resulting in the radiation of different colored light from each of the segments. To achieve a crossover of the artificial light emitted by the lighting element into the illumination body with a low attenuation, the lighting element may be glued onto the side face of the illuminating body. Preferably the used glue possesses the same index of refraction as the material of the illuminating body and is transparent. Therefore no scattering, deflection or attenuation will occur.

In a preferred embodiment, the illuminating body comprises an organic material and/or a polymer, preferably that the illuminating body comprises one of the following materials: polyethylene, polyamide, polypropylene, polystyrene, polymethylmethacrylate (PMMA) or polycarbonate (PC). The usage of polymeric plates for the illuminating body has shown to be advantageous. The named materials have a small attenuation of the light flux, being injected by the lighting element. So a thin illuminating body can be used, which results in a light weight window blind. Furthermore, it is possible to dope the polymeric illuminating body with luminescence materials. Those luminescence materials on the one hand enhance the scattering of the light and on the other hand shift the wavelength of the light. By the usage of the appropriate luminescence material and the appropriate amount, the artificial light of cheap and efficient blue LEDs can be converted partially into yellow light, resulting in white light.

To protect the lamella and/or the illuminating body from environmental impacts, a further preferred embodiment discloses a protection layer. The last named layer may clad the lamella and/or the illuminating body as whole or just parts of it. Furthermore, the protection layer may comprise $SiO_2$, $HfO_2$ or $SiN_x$. Those materials are known to be scratch resistant and unaffected by environmental impacts like humidity. This is especially important, as some polymers are susceptible to hydrolysis, so that an illumination body without protection layer may age due to the environmental impacts.

In a further preferred embodiment a solar cell may cover at least a part of the lamella. The solar cell may generate electrical energy from the ambient light falling onto the window blind. Therefore, the electrical energy may be used to feed the lighting element. Furthermore, the electrical energy may be stored in batteries or super capacitors.

The object of the present invention is also achieved by a window blind system comprising at least one window blind according to any preceding claims and a computer, wherein the window blind is connected via a network with the computer, and the computer controls at least the light extraction means of the at least one window blind.

The aforementioned window blind, as well as claimed components and the components to be used in accordance with the invention in the described embodiments are not subject to any special exceptions with respect to size, shape, material selection. Technical concepts such that the selection criteria are known in the pertinent field can be applied without limitations. Additional details, characteristics and advantages of the object of the present invention are disclosed in the subclaims and the following description of the respective figures—which are an exemplary fashion only—showing a plurality of preferred embodiments of the window blind according to the present invention. These figures show:

DETAILED DESCRIPTION OF EMBODIMENTS

Figure 1:
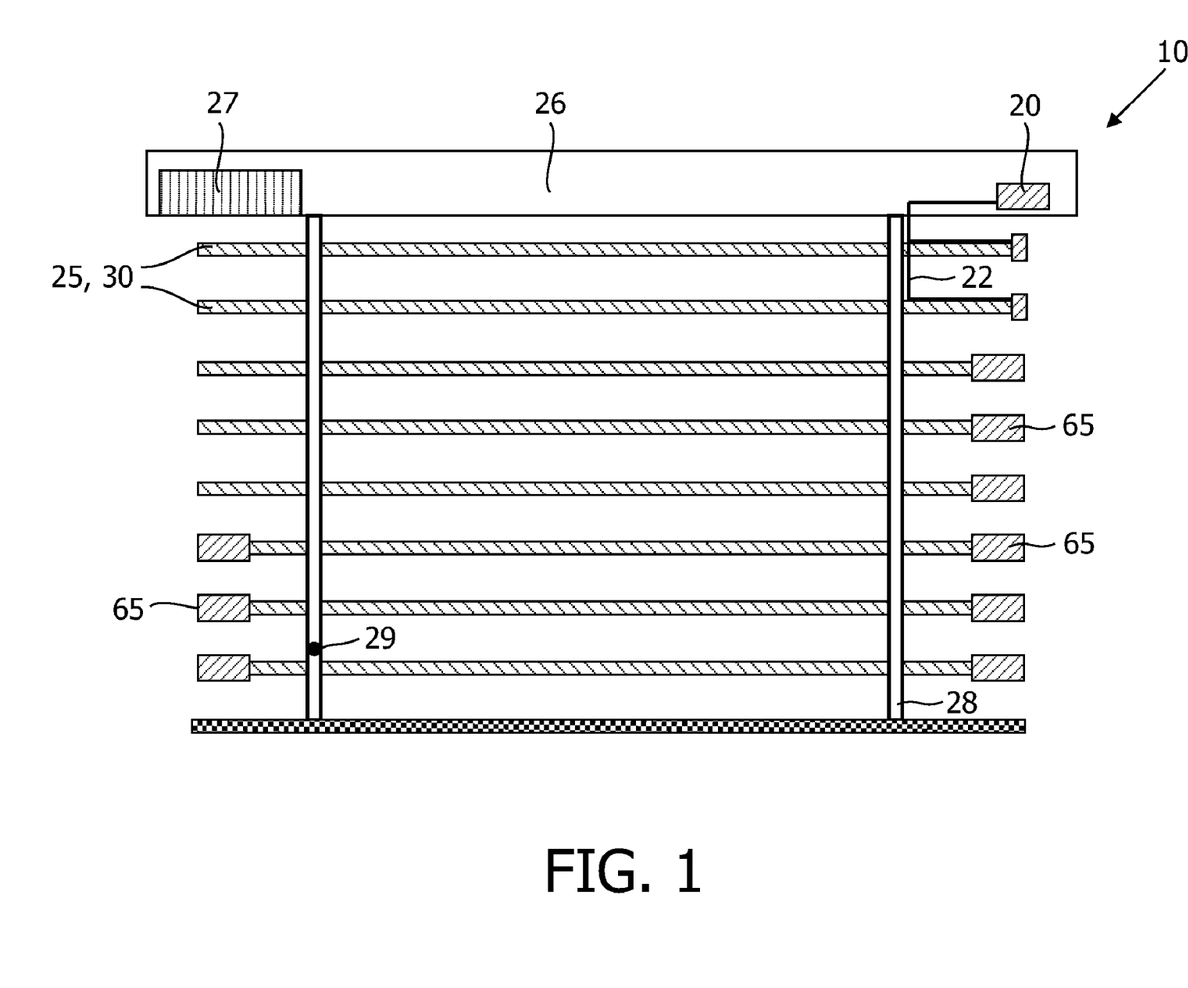
FIG. 1 a schematic view of a window blind.

In FIG. 1 a window blind 10 is shown. The window blind 10 comprises a plurality of lamellae 25, which are parallel aligned and suspended from a housing element 26. The lamellae are connected with a connection means 29 to the housing element 26 in a way that they can be rotated to allow ambient light to pass between the lamellae 25. Therefore, the amount of artificial light flowing through the window blind can individually be adjusted.

Each lamella 25 may comprise at least one enclosure element 65, arranged on one of the side faces of the lamella 25. To use the whole area of the window blind 10 as an illumination device, each lamella 25 comprises an illuminating body 30. The illuminating body 30 is connected with the enclosure element 65 in such a way, that a lighting element 20, embedded within the enclosure element 65, injects an artificial light 21 into the illuminating body 30. However, each lamella 25 may also be connected via an optical fiber 22 with a lighting element 20, embedded in the housing element 26 of the window blind 10. In such a case, one or more optical fibers 22 are being used to guide the artificial light 21 to the illuminating bodies 30. The optical fibers 22 may also be interwoven with the connection means 29 of the window blinds 10. In this embodiment, none or only a very small enclosure element 65 is needed, as no lighting element 20 is arranged at the side faces of the lamella 25. The enclosure element 65 only positions the optical fiber 22 relative to the illuminating body 30.

The illuminating body 30, which shall be described in detail below, comprises a light guiding material, configured to transport the artificial light 21. The lighting elements 20 are driven by a power source 27 integrated in the housing element 26. The electrical connection is achieved by a power line 28 integrated in the connection means 29. To achieve a homogeneously illuminated lamella 25, the artificial light 21 has to be deflected to leave the illuminating body 30. To achieve this aim, the illuminating body 30 comprises a light extraction means 40, configured to receive and to deflect the artificial light 21 out of the illuminating body 30. To overcome the already mentioned disadvantage of known window blinds, the light extraction means 40 is embedded within the illuminating body 30 and the light extraction means 40 is controllable in order to vary the degree of the deflection of the artificial light 21. Therefore, the light extraction means 40 of the disclosed window blind 10 can be manipulated in order to control the degree of deflection of the artificial light 21.

Figure 2:
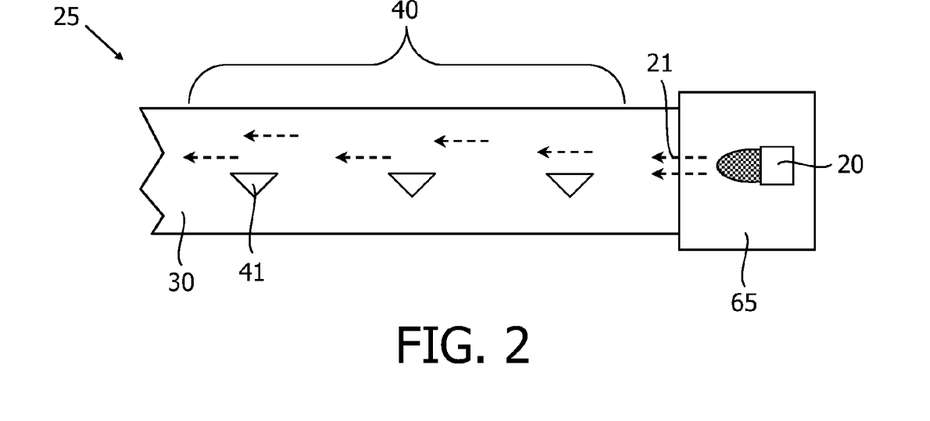
FIG. 2 a cross-section of a lamella of the window blind.
Figure 3:
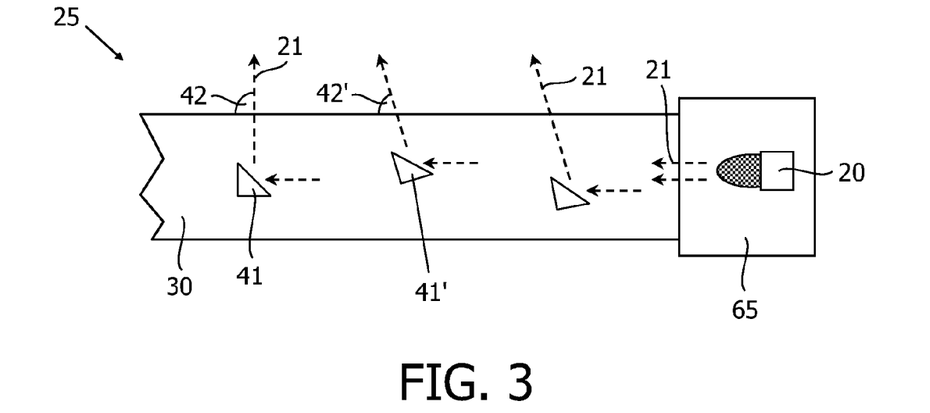
FIG. 3 a cross-section of the lamella with a plurality of embedded light extraction means, FIG. 4 the window blind and a magnification of a part of the lamella, FIG. 5 a cross-section of an illumination body, FIG. 6 a cross-section of another embodiment of the illuminating body, FIG. 7 a lamella with a surface pattern, forming a Fresnel type lens and FIG. 8 the illuminating body with the Fresnel type lens in another embodiment.

In FIGS. 2 and 3 a cross-section of a part of a lamella 25 is shown. On the right end of the lamella 25 the enclosure element 65 contains the lighting element 20, emitting the artificial light 21. The shown configuration of the lamella 25 is only exemplary, as also an optical fiber 22 may end in the housing element 26 to inject the artificial light 21 into the illuminating bodies 30. In the shown embodiment the lamella 25 and the illuminating body 30 are one piece, resulting in a lamella formed by one, mainly rectangular shaped illuminating body 30. Embedded within the illuminating body 30 is the light extraction means 40. In the shown embodiment the light extraction means 40 is formed by a plurality of light extraction particles 41. The light extraction particles 41 are configured to receive and to deflect the artificial light 21 out of the illuminating body. In FIG. 2 the light extraction particles 41 are aligned in such a way, that no deflection of the artificial light 21 occurs. Therefore, the artificial light 21 will float within the illuminating body 30. Apart from scattering at impurities no artificial light 21 will be deflected out of the illuminating body 30. Therefore, a surrounding of the lamella 25 will not be illuminated. The advantage of the invention is illustrated in FIG. 3. In contrast to FIG. 2, the light extraction particles 41,41' are arranged in such a way, that they receive and deflect the artificial light 21 out of the illuminating body 30. In the shown embodiment the arrangement of the light extraction particles 41, 41' is not homogeneous. Artificial light 21 being deflected by the light extraction particle 41 will leave the illuminating body 30 under the angle 42. As the light extraction particle 41' comprises another arrangement within the illuminating body 30, it deflects artificial light 21 under the angle 42'. Therefore, a diffuse but homogeneous illumination of the surrounding of the lamella 25 will occur. In another preferred embodiment of the shown window blind, the arrangement of all light extraction particles 41,41' within one illuminating body 30 may be homogeneous. Therefore, a focused light flux can be achieved. In the shown embodiment the light extraction particles 41,41' may be formed by small metallic particles which can be aligned through an electrical field. In this embodiment, the light extraction particles 41,41' are homogeneously aligned, if a voltage is applied, and wherein the light extraction particles 41, 41' are randomly arranged, if no voltage is applied. Therefore, by controlling the voltage applied to the illuminating body 30 the degree of deflection of the artificial light 21 is controllable.

Figure 4:
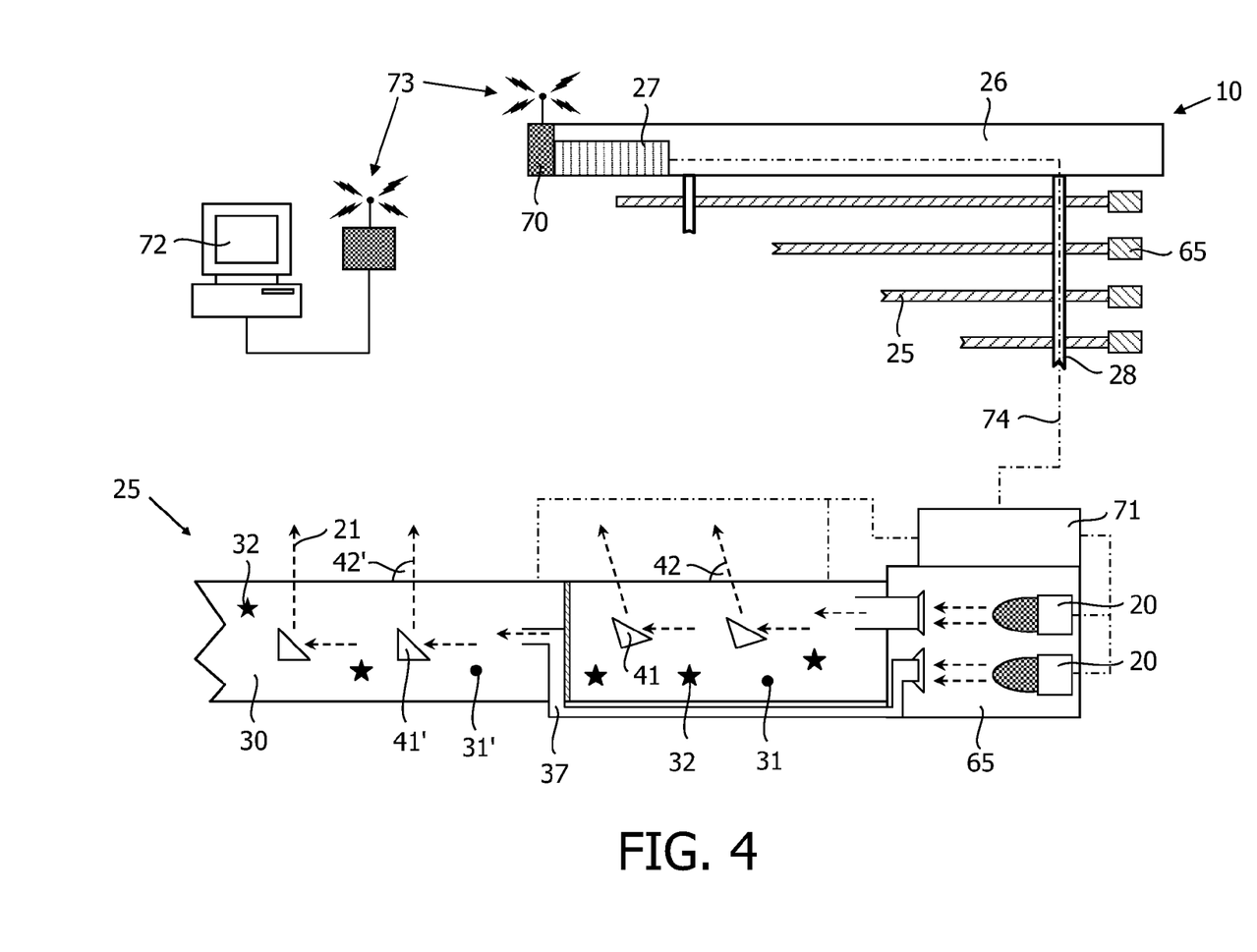

To control the degree of deflection of the artificial light 21 by the light extraction means 40 respectively the light extraction particles 41,41' the window blind 10 may comprise a computerized control system 70. The computerized control system 70 may be embedded within the housing element 26 and connected through a connection 74 with each lamella 25. In the embodiment shown in FIG. 3 each lamella 25 comprises a computerized control element 71 which is mounted onto or contained in the enclosure element 65. The computerized control element 71 controls the lighting elements 20, in FIG. 4 two LEDs. Furthermore, the illuminating body 30 comprises a plurality—here two—of segments 31,31'. Each of the segments 31,31' is individually controlled by the computerized control element 71. Therefore, the deflection of the artificial light 21 by the light extraction means 40 in each of the segments 31, 31' is independently controllable by the computerized control element 71. To illuminate each of the segments 31, 31' optical fibers 37 may be embedded within the lamella 25. Each optical fiber 37 is connected with one lighting element 20, guiding the artificial light 21 to each of the segments 31,31'. In the segments 31,31' the artificial light 21 is received and deflected by the light extraction particles 41,41'. In FIG. 4 the first segment 31 comprises light extraction particles 41 which are barely angled, so that the artificial light 21 leaves the section 31 under the small angle 42. In contrast to that, the light extraction particles 41' in the second section 31' are strongly angled, so that the artificial light 21 leaves the segment 31' under the angle 42'.

By the segmentation of each lamella 25 in a plurality of segments 31,31' in combination with the controllable light extraction means 40 the window blind 10 can on the one hand be used to illuminate spots or areas in a room. On the other hand the described window blind 10 may be used to illuminate not only the inner part of a building but also the outer part. Such a window blind 10 could for example be used for beautification or corporate branding. In this case, the window blind 10 could be used as a low resolution display showing the trademark or slogans connected to the company, owning the house in which the window blinds 10 are installed. To achieve different colors, the lighting elements 20 could be of various types and may emit artificial light 21 of different wavelength. Furthermore, each of the segments 31,31' may comprise a colorant means 32, which may comprise a luminescence material. Artificial light 21 striking the colorant means 32 may be absorbed and reemitted with a different wavelength. Through the usage of the colorant means 32 an efficient and cheap way of achieving colored light is disclosed. Additionally, the computerized control system 70 of the window blind 10 may be connected to a centralized computer 72. This computer may be connected via a WLAN (wireless local area network) 73 with one or a plurality of window blinds 10. Even a connection of the window blind 10 with the internet is possible. Therefore, the computerized control system 70 may be connected by a wire or wireless with the computer 72 with direct excess to the internet. A facility manager could manipulate each window blind 10 or each segment 31,31' of each lamella 25 individual through a software program running on the computer 72 respectively in the internet. Therefore, a centralized and easy control of the window blind 10 is possible.

Figure 5:
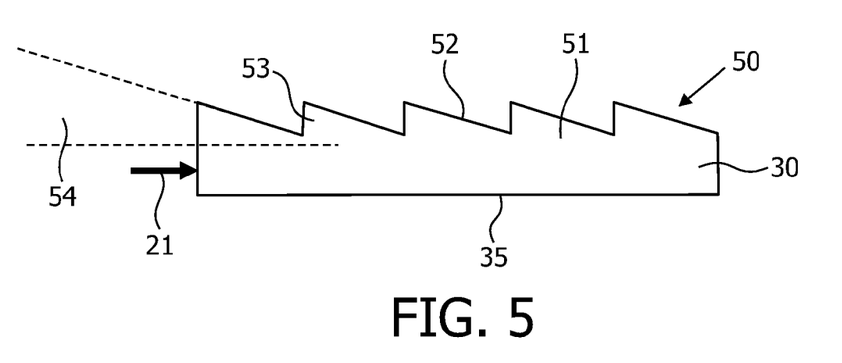

To support the light extraction means 40 the illuminating body 30 may comprise a light extraction layer 50. The light extraction layer 50 may for example be a micro structure, being configured to receive and to deflect the artificial light 21 out of the illuminating body 30. The configuration of the light extraction layer 50 is shown in the FIGS. 5 and 6, only illustrating the illuminating body 30. To deflect the artificial light 21 out of the illuminating body 30 the light extraction layer 50 possesses a surface structure. This surface structure comprises a plurality of deflection means 51, which are arranged in a consecutive manner. In FIG. 5 a magnification of a cross section of the illuminating body 30 is shown. The artificial light 21 enters the illuminating body 30 from the left side. Each deflection means 51 possesses a saw tooth like cross section with a flange 53, sharply rising from the illuminating body 30. Subsequent, the deflection means 51 possesses a face 52, which may ramp downwards as the distance to the lighting element 20 increases. So a saw tooth like structure is built, possessing a triangular shape. The face 52 possesses an angle 54, measured with respect to the longitudinal extension of the illuminating body 30. As the index of refraction of the surrounding air differs from the index of refraction of the material of the illuminating body 30 total internal reflection occurs. Thus, artificial light 21 meeting the air—illuminating body 30/light extraction layer 50 boundary can be reflected leaving the illuminating body 30 mainly through the surface 35. Apart from the shown saw tooth like structure, the deflection means 51 may possess a plurality of different cross sections.

Figure 6:
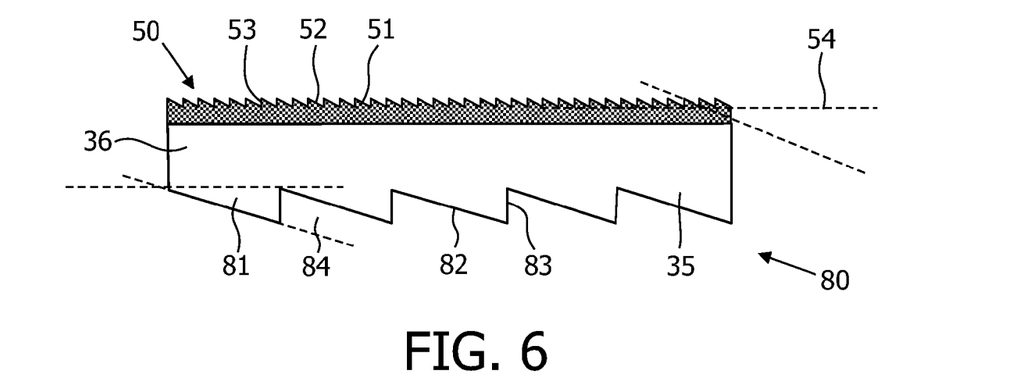

In another embodiment, shown in FIG. 6, the illuminating body 30 comprises a surface pattern 80, forming a Fresnel type lens. By integrating a Fresnel type lens onto the window blind 10 the last named can be used for a plurality of different tasks. For example the window blind 10 can be used as a flexible wall which is visually separating rooms. Due to the Fresnel type lens the image is distorted but the light is still propagating through the window blind 10. This way privacy can be obtained without losing light by the usage of the disclosed window blind 10. Furthermore, the window blind 10 can be used in front of a window and focus sunlight into a room. Especially large rooms can homogeneously be illuminated by using window blinds 10 with the integrated Fresnel type lens.

The surface pattern 80, needed to distort the image, comprises a plurality of refractor means 81. Each refractor means 81 is arranged in a consecutive manner covering a surface of the illuminating body 30. In the shown embodiment each refractor means 81 possesses a saw tooth like cross-section with a flange 83, sharply rising from the illuminating body 30. Subsequently the refractor means 81 possesses a facet surface 82 which ramps towards the illuminating body 30. Therefore the saw tooth like structure is inversed to those of the extraction layer 50. To achieve a homogeneous distortion, the refractor means 81 may be arranged in a homogeneous manner. Furthermore, the angle 84 between the facet surface 82 and the longitudinal axis of the illuminating body 30 may change with respect to the distance to the lighting element 20.

Figure 7:
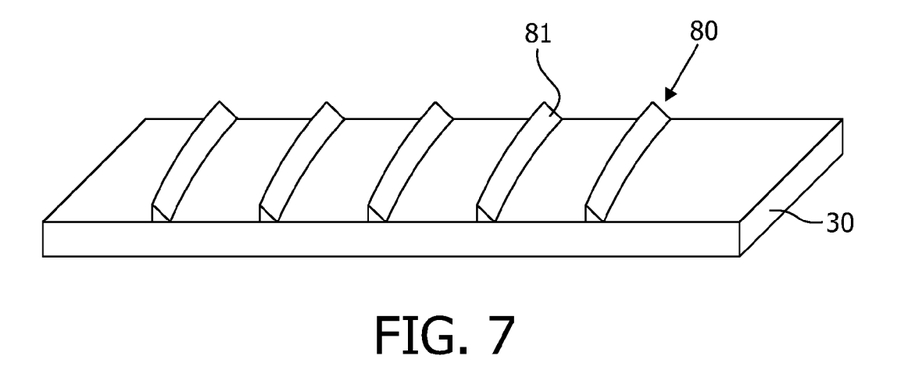
Figure 8:
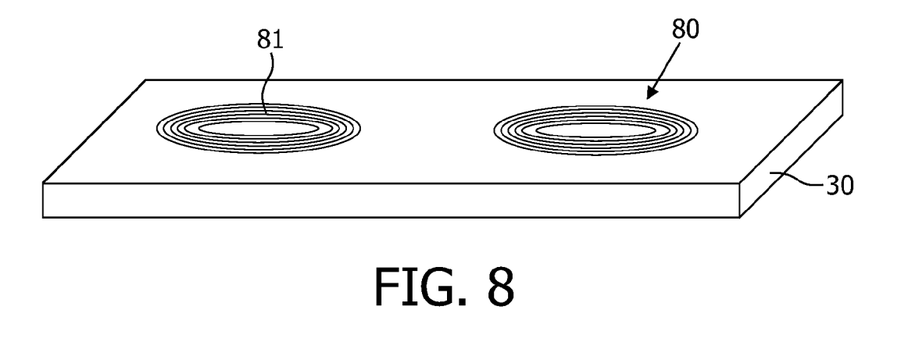

In FIG. 7 a section of the illuminating body 30 is shown. The refractor means 81 are arranged in a linear structure, so that the surface pattern 80 comprises of a plurality of rows of refractor means 81. Due to the combination of a number of lamellae forming the window blind 10 one huge Fresnel type lens is formed by the number of surface pattern 80. Therefore, the window blind 10 can be used to direct light onto a dedicated spot. In contrast to that, in FIG. 8, a part of an illuminating body 30 is shown with two Fresnel lenses, each comprise a plurality of concentric annular arranged refractor means 81. A window blind 10 comprising lamellae 25 with a number of Fresnel type lenses as shown in FIG. 8 is useful to achieve a distorted picture for privacy reasons.

LIST OF NUMERALS 10 window blind
20 lighting element
21 artificial light
22 optical fiber
25 lamella
26 housing element
27 power source
28 power line
29 connection means
30 illuminating body
31,31' segment of illuminating body
32 colorant means
35 surface of the illuminating body
37 optical fiber
40 light extraction means
41,41' light extraction particle
42,42' angle of artificial light 21
50 light extraction layer
51 deflection means
52 face of the deflection means 51
53 flange of the deflection means 51
54 angle of the light extraction layer
65 enclosure element
70 computerized control system
71 computerized control element
72 computer
73 WLAN
74 connection
80 surface pattern
81 refractor means
82 facet of the refractor means 81
83 flange of the refractor means 81

The invention claimed is:

1. A window blind (10)
with at least one lamella (25) and at least one lighting element (20), wherein
the lamella (25) comprises an illuminating body (30),
the lighting element (20) injects an artificial light (21) into the illuminating body (30),
the illuminating body (30) comprises a light guiding material, configured to transport the artificial light (21),
the illuminating body (30) comprises a light extraction means (40), configured to receive and to deflect the artificial light (21) out of the illuminating body (30),
characterized in that,
the light extraction means (40) is embedded within the illuminating body (30), and
the light extraction means (40) is controllable, in order to vary the degree of deflection of the artificial light (21).

2. A window blind (10) according to claim 1,
characterized in that the light extraction means (40) comprises a plurality of light extraction particles (41,41'), preferably that the light extraction particles (41,41') are homogeneously aligned, if a voltage is applied, and wherein the light extraction particles (41,41') are randomly arranged, if no voltage is applied.

3. A window blind (10) according to claim 1,
characterized in that the illuminating body (30) and the light extraction means (40) form at least one of the following: a suspended particle device, a LCD (Liquid Crystal Display) structure or an electro-chromic device.

4. A window blind (10) according to claim 1,
characterized in that the illuminating body (30) covers one of the surfaces of the lamella (25), preferably that the illuminating body (30) and the lamella (25) are one piece.

5. A window blind (10) according to claim 1,
characterized in that the window blind (10) comprises a computerized control system (70) to control the light extraction means (40).

6. A window blind (10) according to claim 1,
characterized in that each lamella (25) comprises a computerized control element (71) to control the light extraction means (40).

7. A window blind (10) according to claim 6,
characterized in that the computerized control element (71) of the lamella (25) is connected to and controlled by the computerized control system (70), preferably that the computerized control system (70) or the computerized control element (71) are connected via a LAN (Local Area Network) or WLAN (Wireless Local Area Network) with an computer (72).

8. A window blind (10) according to claim 1,
characterized in that the illuminating body (30) comprises a plurality of segments (31,31'), wherein the light extraction means (40) of each segment (31,31') is independently controllable.

9. A window blind (10) according to claim 8,
characterized in that each segment (31,31') is connected with the computerized control element (71).

10. A window blind (10) according to claim 1,
characterized in that the illuminating body (30) comprises a surface pattern (80), forming a Fresnel-type lens.

11. A window blind (10) according to claim 10,
characterized in that the surface pattern (80) comprises a plurality of refractor means (81), preferably that the surface pattern (80) covers one of the surfaces of the illuminating body (30), more preferably that the illuminating body (30) and the surface pattern (80) are one piece.

12. A window blind (10) according to claim 1,
characterized in that the lighting element (20) is embedded in a enclosure element (65), preferably that the enclosure element (65) is arranged on one of the side faces of the illuminating body (30).

13. A window blind system comprising at least one window blind (10) according to claim 1 and a computer (72),
wherein the window blind (10) is connected via a network with the computer (72), and
the computer (72) controls at least the light extraction means (40) of the at least one window blind (10).

* * * * *